US008462952B2

(12) United States Patent
Hoover et al.

(10) Patent No.: US 8,462,952 B2
(45) Date of Patent: Jun. 11, 2013

(54) SYNCHRONIZING MANAGEMENT SIGNALING IN A NETWORK

(75) Inventors: Scott J. Hoover, Allen, TX (US); Hollitte D. Greene, IV, Logan, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 487 days.

(21) Appl. No.: 12/546,773

(22) Filed: Aug. 25, 2009

(65) Prior Publication Data

US 2011/0051932 A1 Mar. 3, 2011

(51) Int. Cl.
*H04K 1/00* (2006.01)
(52) U.S. Cl.
USPC ............. 380/270; 726/15; 713/150; 709/224; 709/225
(58) Field of Classification Search
USPC ...................... 380/270; 726/15; 709/223–225, 709/229, 248
See application file for complete search history.

(56) References Cited

U.S. PATENT DOCUMENTS

| | | | | |
|---|---|---|---|---|
| 6,976,071 B1 * | 12/2005 | Donzis et al. | .................. | 709/224 |
| 7,124,183 B2 * | 10/2006 | Pekary et al. | .................. | 709/224 |
| 7,672,264 B2 * | 3/2010 | Babin | ........................... | 370/318 |
| 2004/0068666 A1 * | 4/2004 | Tosey | ............................. | 713/201 |
| 2007/0297609 A1 * | 12/2007 | Adams et al. | ................. | 380/270 |
| 2007/0298848 A1 * | 12/2007 | Babin | ........................... | 455/574 |
| 2008/0112354 A1 * | 5/2008 | Toutonghi | ..................... | 370/328 |
| 2008/0120714 A1 * | 5/2008 | Monette et al. | ................. | 726/11 |
| 2008/0134316 A1 * | 6/2008 | Devonshire et al. | ............ | 726/15 |
| 2008/0148409 A1 * | 6/2008 | Ampunan et al. | .............. | 726/26 |
| 2008/0172582 A1 * | 7/2008 | Sinicrope et al. | .............. | 714/48 |
| 2009/0204265 A1 * | 8/2009 | Hackett | ......................... | 700/284 |

* cited by examiner

*Primary Examiner* — Ashok B. Patel
*Assistant Examiner* — Linglan Edwards

(57) ABSTRACT

A method includes receiving a communication from a management domain associated with managing a cellular communication network. The method also includes determining whether the communication corresponds to a polling signal from the management domain, and generating a first ping for transmission to a data center associated with managing virtual private networks (VPNs) in the cellular network in response to determining that the received signal corresponds to the polling signal. The method may further include generating a second ping for transmission via an encrypted path in the cellular communication network in response to determining that the received signal corresponds to the polling signal and that data is ready to be transmitted via the encrypted path. The first ping and the second ping may be used to ensure that cellular connections through the cellular communication network are operating properly.

19 Claims, 5 Drawing Sheets

SYNCHRONIZING MANAGEMENT SIGNALING IN A NETWORK

BACKGROUND INFORMATION

Cellular networks are primarily designed to carry voice traffic. Typical voice calls last for a short duration. Therefore, cellular networks are able to accommodate a large number of customers making voice calls. Cellular networks, however, are now being used increasingly for data traffic. Data traffic has a tendency to use network resources for long periods of time, which may effectively use resources originally intended for handling voice traffic. As a result, telecommunication service providers face increasing demands to accommodate both voice and data traffic over cellular networks.

Telecommunication service providers now offer customers, such as mobile users, services that provide Internet access over cellular networks designed to support data traffic. The use of the cellular networks to support high speed data traffic requires considerable overhead to maximize resource utilization. As a result of the increasing volume of data traffic, the overhead required to manage the traffic has greatly increased for telecommunication service providers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to systems and methods to reduce the volume of management-related traffic in a network, such as a broadband wireless network. In an exemplary implementation, a management domain may poll a network device that provides customers with connectivity to the Internet. When the network device receives the polling signal, various other management related messages may be synchronized with the polling signal. For example, various pings, or other messages may be used to ensure connectivity for the customers may be generated in response to receiving the polling signal. Generating various management-related signals/messages in response to receipt of the poling signal effectively synchronizes these management-related signals and may help reduce the number of connections from various cell towers to the network device.

Figure 1:
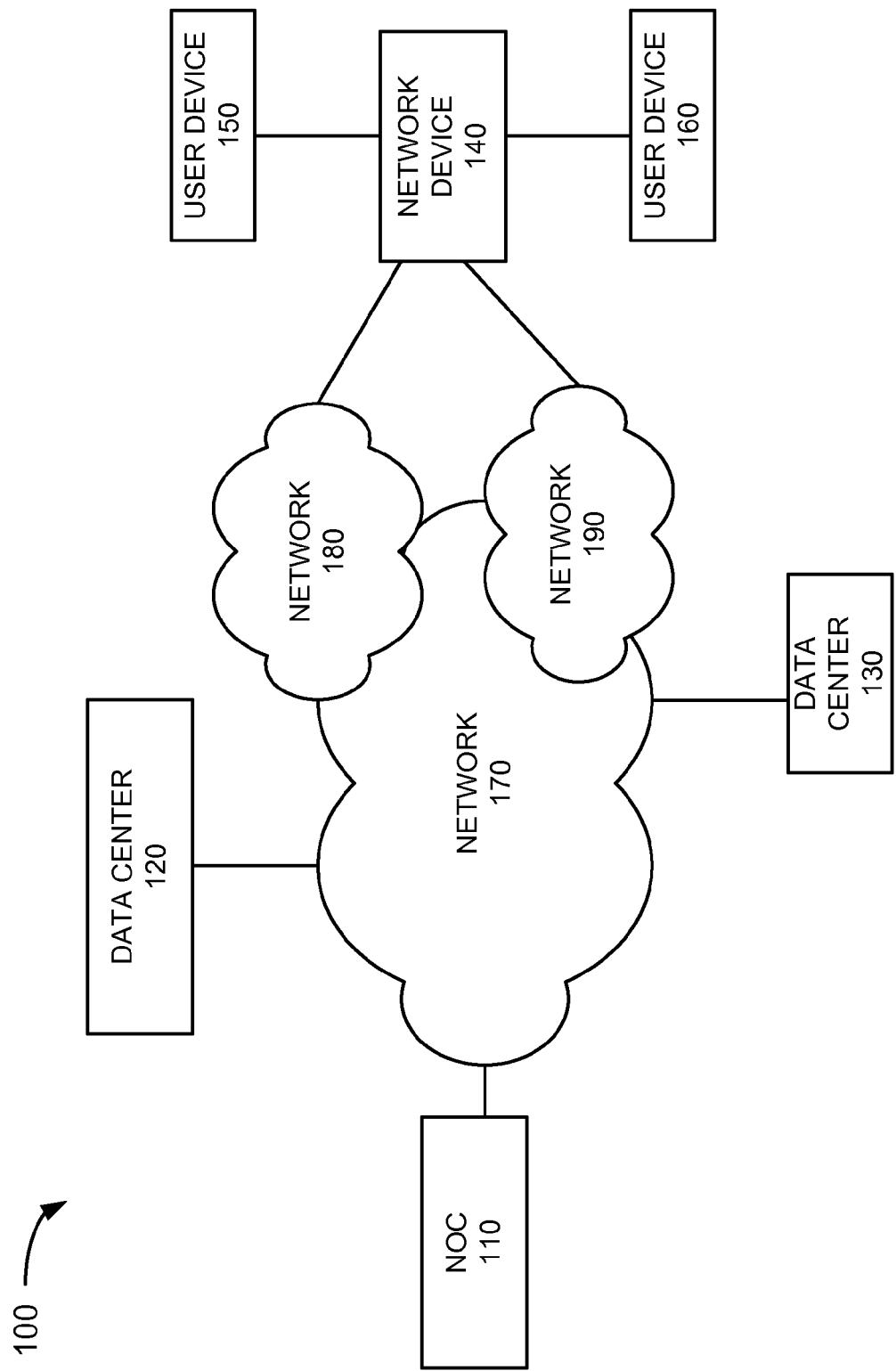
FIG. 1 illustrates an exemplary network in which systems and methods described herein may be implemented.

FIG. 1 is a block diagram of an exemplary network 100 in which systems and methods described herein may be implemented. Network 100 may include network operation center (NOC) 110, data center 120, data center 130, network device 140, user devices 150 and 160 and networks 170, 180 and 190.

In an exemplary implementation, NOC 110 may represent a management domain that provides administrative, control and management-related services associated with providing customers with broadband wireless access to networks 170, 180 and/or 190. For example, NOC 110 may manage Internet-related services for a telecommunications service provider that provides customers with access to the Internet via a cellular network, such as network 180.

Data center 120 may represent a primary data center associated with the telecommunications service provider that provides customers with Internet access via networks 170, 180 and/or 190. For example, data center 120 may include primary and backup servers associated with implementing and maintaining virtual private networks (VPNs) in network 170, 180 and/or 190. The VPNs may allow customers to access the Internet in a secure manner, as described in more detail below.

Data center 130 may represent another data center associated with the telecommunications service provider that provides customers with Internet-related services. For example, data center 130 may include primary and backup servers associated with providing customers with Internet access via network 190, which may include a dial access network (DAN). Data center 130 and network 190 may act as backups to data center 120 and network 180 in the event of a problem with data center 120 and/or network 180 or congestion associated with network device 140 accessing network 180.

Network device 140 may represent a server, router or other network device associated with providing remote users with access to network 180 and/or 190. For example, in one implementation, network device 140 may be a router that receives access requests from a large number of user devices (e.g., hundreds of user devices), such as user devices 150 and 160, requesting wireless Internet access, as described in detail below. In an exemplary implementation, network device 140 may connect to networks 180 and 190, as illustrated in FIG. 1, to provide Internet access. Network device 140 may also receive management-related messages from, for example, NOC 110. In such instances, the management-related messages may be transmitted via networks 170 and 180. In some instances, the message may be transmitted from a cell tower included in network 180 to network device 140 via radio frequency (RF) signaling, as described in more detail below.

User devices 150 and 160 may each represent any user device, such as a mobile terminal (e.g., a cellular telephone), a personal digital assistant (PDA), lap top computer, personal computer (PC), media or game playing device (e.g., MP3 player), or other computing device used to access the Internet. In an exemplary implementation, user devices 150 and 160 may include a modem, such as an "aircard," that allows users to wirelessly connect with network device 140 when requesting Internet access.

Only a single network device 140 and two user devices 150 and 160 are illustrated in FIG. 1 for simplicity. In some implementations, hundreds of network devices 140 may be used to provide network (e.g., Internet) access to thousands of user devices.

Network 170 may include one or more wired, wireless and/or optical networks that are capable of receiving and transmitting data, voice and/or video signals, including multimedia signals that include voice, data and video information. For example, network 170 may include one or more public switched telephone networks (PSTNs) or other type of switched network. Network 170 may also include one or more wireless networks and may include a number of transmission towers for receiving wireless signals and forwarding the wireless signals toward the intended destinations. Network 170 may further include one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

Network 180 may include a broadband network that allows mobile users to connect to network 170 (e.g., the Internet). In an exemplary implementation, network 180 may include the evolution data optimized (EVDO) network that provides mobile users with broadband Internet access for uploading and downloading information via wireless links at high speeds. In such an implementation, network 180 may include a number of cell towers, base station transceivers and antennas for transmitting and receiving data via RF signals. In addition, network 180 may include VPNs that allow customers to access information (e.g., corporate networks, home networks or other networks) via the Internet in a secure manner.

Network 190 may include a dial access network (DAN) that allows users to access network 170. In an exemplary implementation, network 190 may function as a backup network for mobile users accessing networks 170 and/or 180. For example, if connections from network device 140 to network 180 are not available, network device 140 may connect users to network 170 via network 190.

The exemplary network configuration illustrated in FIG. 1 is provided for simplicity. It should be understood that a typical network 100 may include more or fewer devices than illustrated in FIG. 1. For example, as discussed briefly above, a conventional network 100 may include hundreds or thousands of network devices 140 that provide Internet access for hundreds or thousands of user devices similar to user devices 150 and 160. Network 100 may also include additional elements, such as routers, gateways, switches, cellular towers, etc., that aid in routing traffic toward its intended destination.

Figure 2:
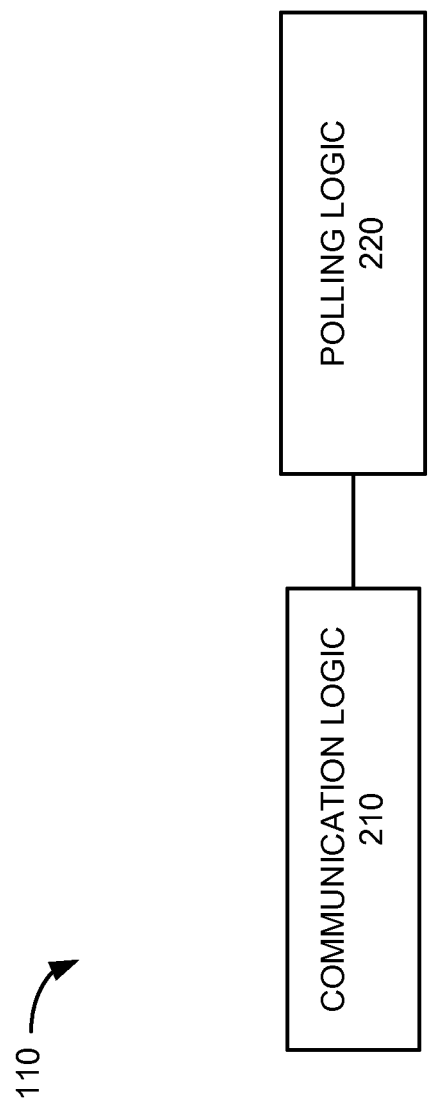
FIG. 2 illustrates an exemplary configuration of the network operation center of FIG. 1.

As described above, NOC 110 may manage Internet-related services for a telecommunications service provider that provides customers with access to the Internet via networks 170, 180 and/or 190. FIG. 2 illustrates an exemplary configuration of NOC 110. Referring to FIG. 2, NOC 110 may include communication logic 210 and polling logic 220. The configuration illustrated in FIG. 2 is provided for simplicity. In other implementations, more or fewer components may be included in NOC 110. For example, NOC 110 may include various memory devices, processors, computers, servers, routers, etc., that aid in controlling and/or managing services provided to customers.

Communication logic 210 may include any transceiver-like mechanism that enables NOC 110 to communicate with other devices and/or systems. For example, communication logic 210 may include one or more logic devices/mechanisms for communicating with data centers 120 and 130 and network device 140 via wired, wireless or optical connections. In an exemplary implementation, communication logic 210 may include a modem or an Ethernet interface to a LAN that connects NOC 110 with network 170, 180 and/or 190 for communication with data centers 120 and 130 and network device 140. In other instances, communication logic 210 may include one or more RF transmitters, receivers and/or transceivers and one or more antennas for transmitting and receiving RF data to and from networks 170, 180 and 190.

Polling logic 220 may include one or more logic devices that generate polling signals commands to poll other devices in network 100. For example, as described above, NOC 110 may operate to coordinate various management-related activities in networks 170-190. In an exemplary implementation, NOC 110 may generate a polling signal or command at every predetermined interval of time (e.g., every six minutes, 10 minutes or any other interval). Polling logic 220 may forward the polling signal to communication logic 210 for transmission to network device 140. This polling signal will act to synchronize and/or initiate various management-related messaging in network 100, as described in detail below.

Figure 3:
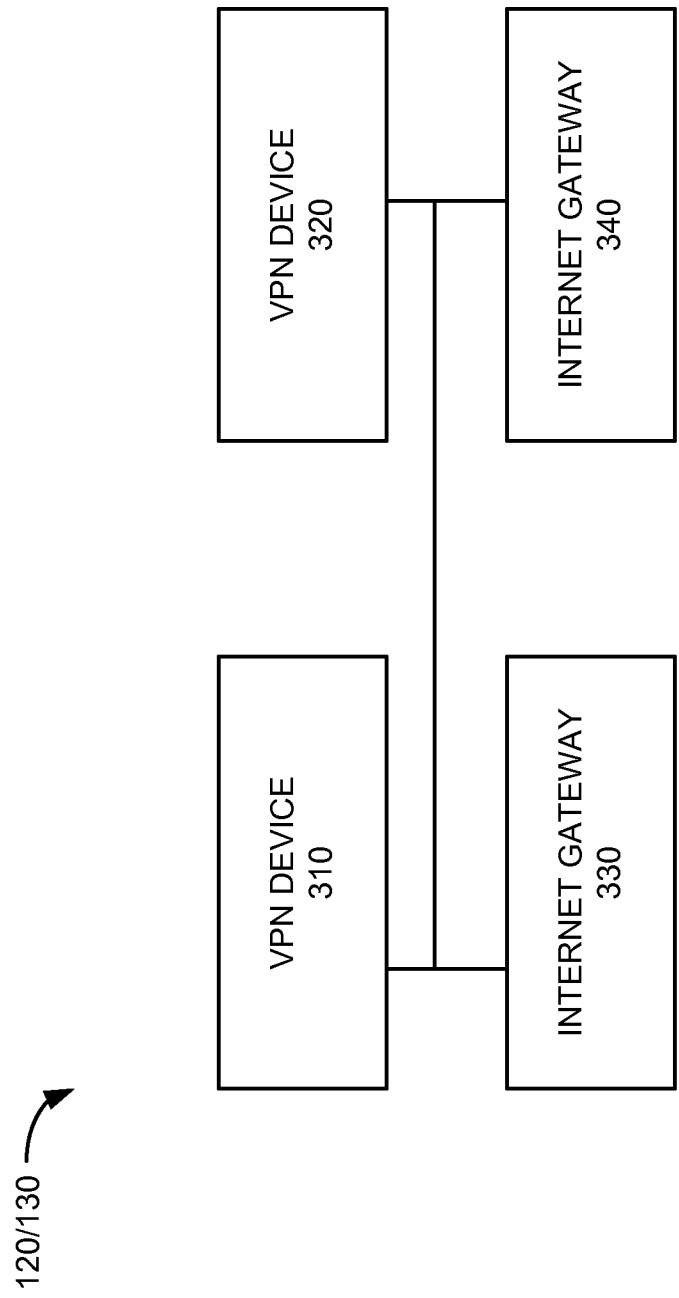
FIG. 3 illustrates an exemplary configuration of the data center of FIG. 1.

FIG. 3 illustrates an exemplary configuration of data center 120. Data center 130 may be configured in a similar manner. In an exemplary implementation, data center 120 may include VPN devices 310 and 320 and Internet gateways 330 and 340. In one implementation, VPN device 310 may include one or more servers or other logic devices that function as a primary VPN server, and VPN device 320 may include one or more servers or other logic devices that function as a backup VPN server. Having primary and backup VPN devices 310 and 320 allows for redundancy or failure recovery in the event that one of VPN devices 310 or 320 fails. In other implementations, VPN devices 310 and 320 may function as VPN servers for different customers and may not function as backup devices for one another.

In either case, VPN devices 310 and 320 may function to control VPNs set up in networks 170, 180 and/or 190. For example, VPN devices 310 and 320 may allow users to set up VPN tunnels via network 180 to allow the user to access information in a secure manner.

Internet gateways 330 and 340 may act as gateway devices for VPN devices 310 and 320 to access network 170, which as discussed above, may include the Internet. Similar to VPN devices 310 and 320, having Internet gateways 330 and 340 may provide for redundancy or failure recovery in the event of a problem with one of Internet gateways 330 and 340. For example, if a problem occurs with Internet gateway 330, Internet gateway 340 may be used to provide Internet access to both VPN devices 310 and 320. In an exemplary implementation, Internet gateways 330 and 340 may each include a first interface that is coupled to an external network (e.g., the Internet) and a second interface that is coupled to a customer's internal network. These interfaces may be "pinged" by network device 140 to ensure network connectivity for customers, as described in detail below.

As described above, VPN devices 310 and 320 may allow customers to access and/or set up VPNs. These VPNs may be managed by a telecommunications service provider associated with NOC 110 and data centers 120 and 130. As also described above, data center 130 may be configured in a similar manner as data center 120. In some implementations, however, data center 130 may include a single VPN device and Internet gateway, as opposed to two VPN devices and Internet gateways illustrated in FIG. 3. In each case, data centers 120 and 130 may communication with network device 140 to provide user devices, such as user devices 150 and 160, with Internet access.

Figure 4:
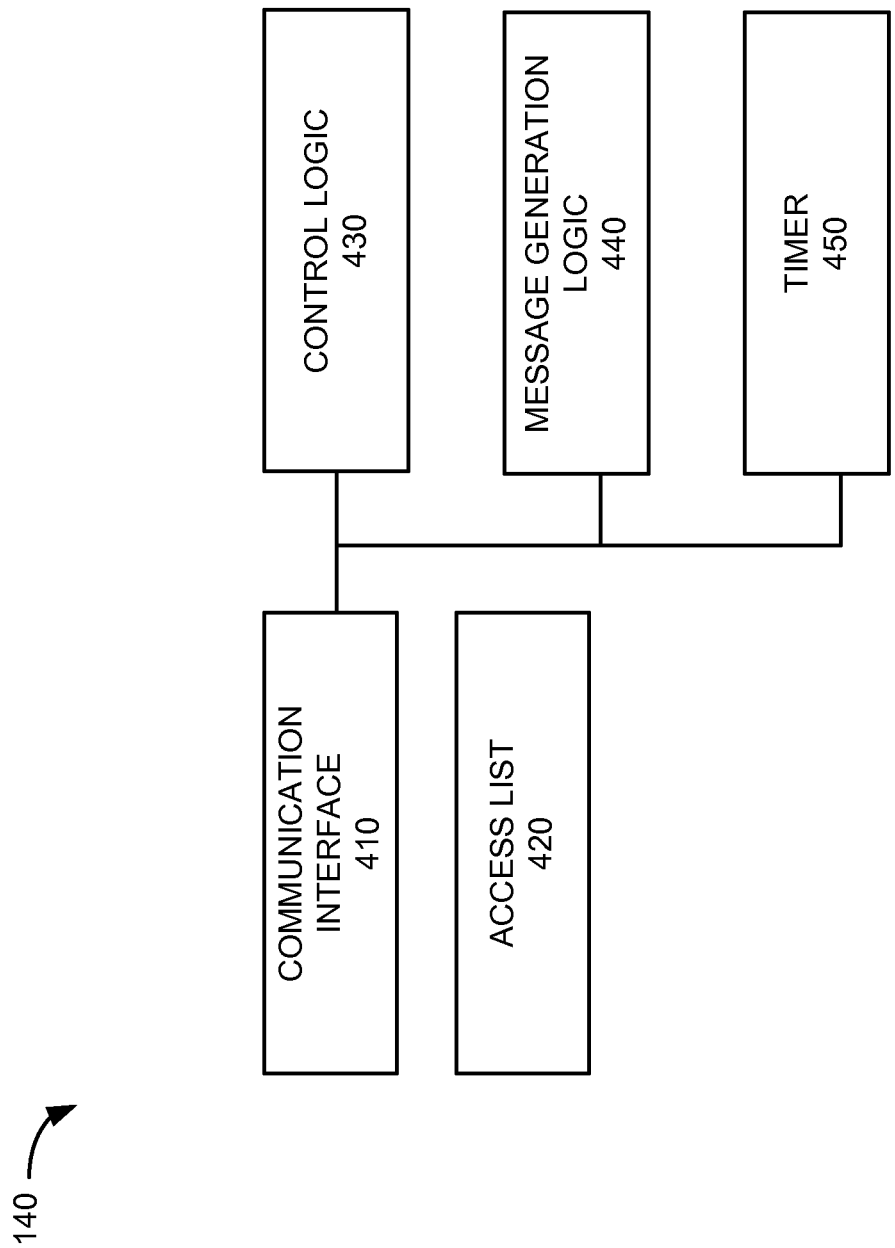
FIG. 4 illustrates an exemplary configuration of the network device of FIG. 1.

FIG. 4 illustrates an exemplary configuration of network device 140. Referring to FIG. 4, network device 140 may include communication interface 410, access list 420, control logic 430, message generation logic 440 and timer 450. Communication interface 410 may include any transceiver-like mechanism that enables network device 140 to communicate with other devices and/or systems. For example, communication interface 410 may include mechanisms for communicating with networks 180 and 190 via wired, wireless or optical connections.

In an exemplary implementation, communication interface 410 may include one or more RF transmitters, receivers, transceivers and/or antennas for receiving RF data transmitted via user devices 150 and 160 and/or network 180. For example, communication interface 410 may receive wireless requests for Internet access (e.g., via aircards) from user devices 150 and 160. Communication interface 410 may also receive a polling signal via RF communications from NOC 110. As described briefly above and in more detail below, the polling signal may be received from a cell tower in network 180 and may be used to coordinate and/or synchronize various management-related traffic in network 100.

Communication interface 410 may also include a modem or an Ethernet interface to a LAN that provides access to networks 180 and 190. For example, communication interface 410 may include a modem for accessing network 190, which as described above, may include a DAN.

Access list 420 may include a list of devices that are associated with managing services in network 100. For example, access list 420 may include information identifying NOC 110 as a device/system associated with managing network device 140. Access list 420 may also store other information identifying particular devices and or addresses of interest associated with management-related signals to be generated by network device 140. For example, in one implementation, access list 420 may store a list of network devices, user devices and/or addresses (e.g., Internet addresses) of devices that are to be pinged upon receipt of the polling signal from NOC 110.

Control logic 430 may include one or more logic devices used to control and synchronize various management-related signaling in network 100. For example, as discussed above, NOC 110 may transmit a polling signal to network device 140. Control logic 430 may receive this signal from communication interface 410 and begin a process to initiate and/or synchronize various management-related signaling in network 100, as described in detail below.

Message generation logic 440 may include one or more logic devices used to generate various control messages used in network 100. For example, message generation logic 440 may generate various pings that will be transmitted from network device 140 to ensure that a cellular connection is active. Message generation logic 440 may also generate various "keep alive" messages to ensure that failover paths become active in the event of trouble with a cellular connection. For example, data to/from a user device, such as user device 150, may be routed via an alternative path in network 180 if a failure or other availability problem is detected in network 180. Alternatively, data to/from user device 150 may be routed via network 190 if a failure or other problem is detected in network 180. In an exemplary implementation, control logic 430 and/or message generation logic 440 may include an embedded event manager that invokes an applet (e.g., software) to generate and/or transmit pings and/or keep alive messages for ensuring connectivity for customer in network 100, as described in detail below.

Timer 450 may be used to coordinate and/or synchronize the transmission of messages in network 100. For example, timer 450 may be used to synchronize the transmission of pings and keep alive messages with receipt of the polling signal from NOC 110.

The exemplary network configuration illustrated in FIG. 4 is provided for simplicity. It should be understood that network device 140 may include more or fewer devices than illustrated in FIG. 4. For example, network device 140 may include various processors/processing logic, input/output ports, memories and/or buffers that aid in routing customer traffic and management-related traffic toward its intended destination.

Figure 5:
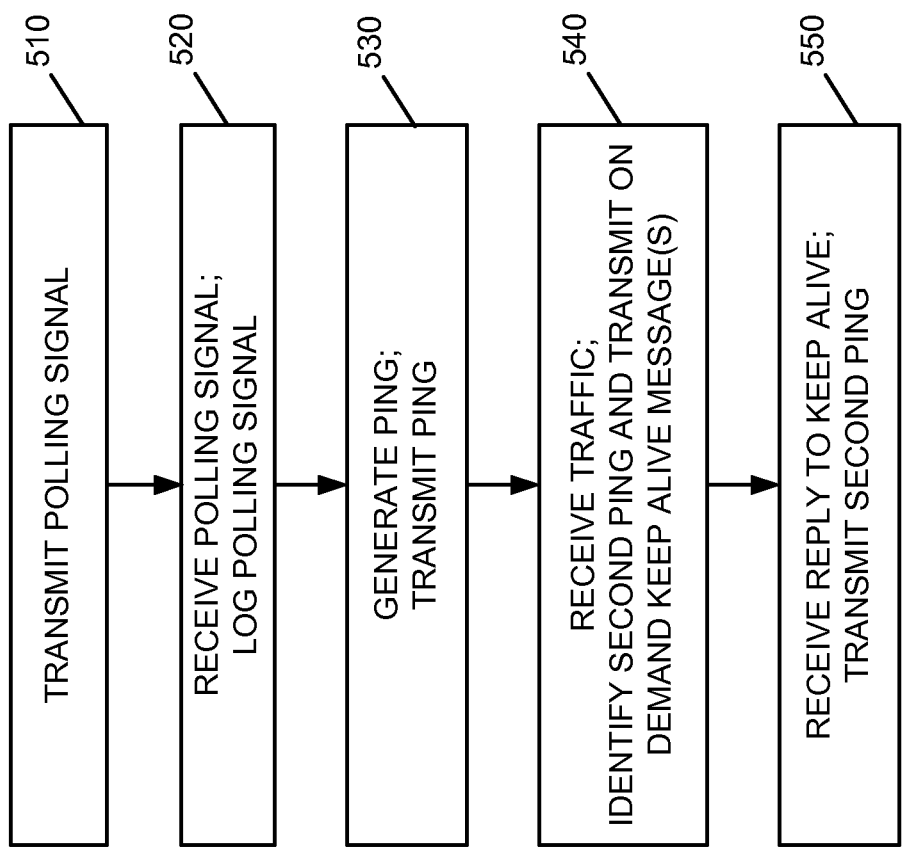
FIG. 5 is a flow diagram illustrating exemplary processing associated with the network of FIG. 1.

FIG. 5 is a flow diagram illustrating exemplary processing associated with generating and transmitting management-related messages in network 100. Processing may begin by NOC 110 transmitting a polling signal to various network devices (act 510). For example, in one implementation, polling logic 220 at NOC 110 may generate a simple network management protocol (SNMP) message/signal every predetermined interval of time (e.g., six minutes, 10 minutes, etc.) and communication logic 210 may transmit the message/signal to network device 140. It should be understood that in alternative implementations, other intervals may be used for transmitting the polling signal and other protocols may be used for the message. In an exemplary implementation, the SNMP polling signal may be transmitted to network device 140 via networks 170 and 180, which may include one or more cellular towers.

For example, network 180, as described above, may be an EVDO network used to provide customers with broadband access to the Internet (e.g., network 170). In such implementations, a cellular tower in network 180 may forward the polling signal wirelessly via RF signaling to network device 140. Since the number of ports in the cell tower that are available for transmitting data may be limited, in an exemplary implementation, the number of calls/signals associated with performing management-related functions may be reduced in network 100 by using the polling signal to initiate various other management-related signaling, described in detail below. In other words, the number of ports on a cell tower used to transmit messages from NOC 110 to network device 140 may be reduced by using the polling signal to initiate the transmission of other management-related messages, as opposed to NOC 110 sending additional control signals to devices in network 100.

Network device 140 may receive the RF polling signal (act 520). For example, communication interface 410 may receive the signal. Control logic 430 may determine whether the received polling signal matches information stored in access list 420. As described above, access list 420 may identify various devices/systems that are associated with managing services in network 100, including managing network device 140. For example, access list 420 may be applied or invoked to the inbound cellular interface of network device 140 and identify NOC 110 as a control system associated with managing network device 140. Assume that control logic 430 and/or communication interface 410 determines that the received polling signal matches information stored in access list 420.

Control logic 430 may log the polling signal (act 520). For example, control logic 430 may log when traffic from various management devices, such as NOC 110, is received. Control logic 430 may also start timer 450 to synchronize transmission of various management-related signals from network device 140 with the received polling signal. For example, as described briefly above, control logic 430 may include an embedded event manager that invokes an applet to automatically enter configuration commands to immediately start a pinging process in response to receipt of the polling signal. The pinging process may be used to ping other devices associated with a cellular connection to ensure that the cellular connection is active. For example, the embedded event manager included in control logic 430 may invoke message generation logic 440, which may include software that generates configuration commands for network device 140 to initiate a ping process in network 100.

In an exemplary implementation, message generation logic 440 may generate a first ping for transmission to data center 120 (act 530). For example, message generation logic 440 may generate a ping-type message that will be sent to data center 120 via networks 180 and 170 (e.g., the Internet) to ensure that the cellular connection to data center 120 is active. As discussed above, Internet gateway 330 and 340 may each include a first interface that faces or is coupled to an external network (e.g., the Internet) and a second interface that faces or is coupled to an internal customer network, which may include one or more encrypted tunnels (e.g., VPNs) within networks 180 and/or 170. In an exemplary implementation, the ping generated by message generation logic 440 may be an Internet control message protocol (ICMP) service level agreement (SLA) probe sent via communication interface 410 to the appropriate destination IP address. In this example, network device 140 may forward the ICMP SLA probe to the first interface (e.g., outside network interface) of Internet gateway 330 (act 530).

Simultaneously or essentially simultaneously with the generation and transmission of the first ping, message generation logic 440 may generate a second ping message and a "keep alive" message. The keep alive message may be used to detect whether a failure in an encrypted path or tunnel in network 180 has occurred. In one exemplary implementation, the keep alive message may be an Internet Key Exchange (IKE) dead peer detection (DPD) keep alive message. Network device 140, however, may set the keep alive message for transmission in an "on demand" manner. For example, network device 140 may not transmit the keep alive message to check the status of the encrypted tunnel until network device 140 has customer traffic to send. In an exemplary implementation, the second ping message may effectively synchronize the transmission of the keep alive message with the second ping message.

For example, assume that network device 140 receives data from a user for transmission via an encrypted tunnel (e.g., a VPN) in network 180 (act 540). This receipt of data by network device 140 may correspond to an on demand event that causes message generation logic 440 to forward the second ping message for eventual transmission to data center 120 via the encrypted tunnel. For example, the second ping message may be forwarded to communication interface 410, which may include an interface for the encrypted tunnel to data center 120. In response to the tunnel interface (e.g., communication interface 410) at network device 140 receiving or identifying the second ping (e.g., an ICMP SLA probe), network device 140 may transmit the IKE DPD keep alive message to the second interface (e.g., the interface associated with the customer network) of Internet gateway 330 (act 540). In some implementations, network device 140 may transmit the IKE DPD keep alive message outside the encrypted tunnel to Internet gateway 330.

Assume that data center 120 receives the keep alive message and responds to the keep alive message sent by network device 140 with a return message over the encrypted path. In this case, communication interface 410 of network device 140 may receive the reply over the encrypted path. Receipt of the return data over the encrypted path may indicate that the encrypted path is operating properly and may cause control logic 430 and/or message generation logic 440 to forward the second ping to data center 120. In an exemplary implementation, the second ping may be transmitted via the encrypted path to ensure that an encrypted data path from network device 140 through network 180 remains active. This encrypted data path may correspond to the path used by user device 150 to access information in a secure manner via a public network, such as the Internet (e.g., network 170).

Similar to the first ping, the second ping generated by message generation logic 440 may be an ICMP SLA probe sent via communication interface 410 to the appropriate destination IP address (e.g., address of data center 120 in this example). More particularly, the second ping may be sent to data center 120 via the encrypted tunnel. An interface that faces the customer's internal network at data center 120 may receive the second ping (e.g., ICMP SLA probe). Data center 120 may recognize the message as a ping and respond with a similar return ping/message if the initial ping/message is received.

By transmitting IKE keep alive messages in response to receipt of traffic (e.g., encapsulating security payload (ESP) packets for transmission on the encrypted path) and/or in response to the tunnel interface at network device 140 receiving the second ping, and then waiting to send the second ping message until a reply to the IKE keep alive message from data center 120 is received, the keep alive message is effectively synchronized with the second ping. That is, the keep alive message sent from network device 140 is sent "on demand" in response to receipt of data (e.g., receipt of the second ping message at the tunnel interface of network device 140) and the second ping is transmitted to data center 120 in response to return of the keep alive message from data center 120 over the encrypted data path. This enables network 100 to synchronize or coordinate the transmission of pings and keep alive messages in response to receiving a polling signal from NOC 110. This may help reduce transmissions from cell towers in network 180 to network device 140 for the purpose of performing management-related signaling associated with maintaining active paths in network 100.

In addition, timer 450 in network device 140 may be used to automatically match the timing associated with the incoming polling signal. That is, the pings and on demand keep alive messages may be sent at the same interval that the polling signal is received. In this manner, the polling signal, pings and keep alive messages are effectively synchronized.

In some instances, such as when a problem exists in network 180 and/or data center 120, a keep alive message may alternatively (or additionally) be sent to data center 130. For example, in a situations in which a response to the first keep alive message is not received via the encrypted tunnel within a predetermined period of time, the network device 140 may generate a second keep alive message for sending to data center 130. If data is received back from data center 130 in response to the second keep alive message, network device 140 may send a ping to data center 130 to ensure that network connections to the customer's network remain active. In this manner, on demand keep alive messages ensure that a backup path is available in network 100. In addition, the pings may be used to ensure that if a connection within network 180 or data center 120 goes down, the connections come back up within a specific time in response to the receipt of the ping.

In instances when responses to the pings and/or keep alive messages are not received within a predetermined time, network device 140, NOC 110, data center 120 and/or data center 130 may initiate a "failover" or failure recovery mechanism to set up an alternate path(s) in networks 170, 180 and/or 190 on which to route the customer's data. For example, network device 140 may transmit data on pre-configured alternative paths. In each case, network device 140 may transmit the pings and/or keep alive messages to alternate paths to ensure that connectivity for user device 150 is available.

Implementations described herein provide for generating and transmitting management-related messages in an efficient manner. For example, calls to a network device may be significantly reduced as compared to conventional systems. This may allow network 100 to ensure that user devices will have access to network services, while limiting overhead messages. This may also allow a telecommunications service provider to use less resources with respect to managing a cellular network.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to transmitting particular types of messages (e.g., pings and keep alive messages). In some implementations, other types of signaling may be used to ensure that users wishing to access the Internet or other network will have connection to a wireless network (e.g., network 180).

In addition, features have been described above with transmitting a polling signal to a single network device 140. It should be understood that NOC 110 may forward similar polling signals to other network devices 140 in network 100 in a similar manner.

Further, while series of acts have been described with respect to FIG. 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    transmitting, from a management device associated with managing a cellular network, a polling signal to a network device, wherein the network device is configured to connect a plurality of user devices to the cellular network;
    receiving, by the network device, the polling signal;
    generating and transmitting by the network device, in response to receiving the polling signal, a first ping to a data center over an unencrypted data path, wherein the data center includes primary and backup network devices associated with maintaining private networks;
    generating, simultaneously or substantially simultaneously with the generating and transmitting of the first ping, a second ping and a keep alive message;
    transmitting, by the network device, the keep alive message to the data center in response to receipt of data from one of the plurality of user devices for transmission over an encrypted data path;
    receiving a reply to the keep alive message over the encrypted data path; and
    transmitting by the network device, in response to receiving the reply to the keep alive message, the received data from the one of the plurality of user devices to the data center over the encrypted data path.

2. The method of claim 1, wherein the transmitting a keep alive message further comprises:
    transmitting the keep alive message in response to receipt of the data from a user for transmission over the user's network.

3. The method of claim 2, wherein the transmitting the keep alive message comprises:
    transmitting the keep alive message to an interface at the data center that is coupled to the user's network.

4. The method of claim 1, further comprising:
    transmitting the polling signal at predetermined intervals.

5. The method of claim 1, further comprising:
    transmitting a second keep alive message to a second data center, in response to receipt of data traffic on a path associated with the second data center.

6. The method of claim 1, wherein the first ping is used to determine whether a cellular connection to the data center is active.

7. The method of claim 6, transmitting the second ping to an interface at the data center coupled to a user's network to determine whether a cellular connection to the user's network is active.

8. The method of claim 1, wherein the generating a keep alive message comprises:
    generating, by the network device, the keep alive message, the keep alive message comprising an Internet Key Exchange dead peer detection message configured to be transmitted in an on demand mode.

9. The method of claim 1, wherein the transmitting a polling signal comprises forwarding the polling signal via radio frequency communications to the network device, and wherein the network device comprises a router.

10. The method of claim 1, wherein each of the first and second pings comprises an Internet control message protocol service level agreement probe message.

11. A device, comprising:
    a communication interface configured to receive communications from a system associated with managing a cellular communication network providing Internet access to a plurality of user devices;
    logic configured to:
        determine whether a received signal corresponds to a polling signal from the system,
        generate a first ping for transmission to a data center over an unencrypted path in response to determining that the received signal corresponds to the polling signal,
        generate a second ping and a keep alive message, simultaneously or substantially simultaneously with the generating of the first ping, for transmission via an encrypted path in the cellular communication network in response to determining that the received signal corresponds to the polling signal,
    transmit the keep alive message to the data center in response to receipt of data from one of the plurality of user devices,
    receive a reply to the keep alive message via the encrypted path, forward, in response to receiving the reply to the keep alive message, the received data from the one of the plurality of user devices to the data center via the encrypted path; and a non-transitory memory comprising an access list configured to store information identifying the system associated with managing the cellular communication network, wherein when determining whether the received signal corresponds to the polling signal, the logic is configured to:

access the access list to determine whether information in the polling signal matches information stored in the access list.

12. The device of claim 11, wherein the logic is further configured to:

transmit the first ping, the second ping and the keep alive message.

13. The device of claim 11, wherein transmission of the first ping, second ping and keep alive message are synchronized with the polling signal.

14. The device of claim 11, wherein the device comprises a router.

15. The device of claim 11, wherein the device is configured to act as an interface for the plurality of user devices requesting access to the Internet and wherein the logic is further configured to:

transmit the first ping, second ping and keep alive message via the communication interface to ensure connectivity through the cellular communication network for users.

16. A method, comprising:

receiving a communication from a management domain associated with managing a cellular communication network;

determining whether the communication corresponds to a polling signal from the management domain;

generating and transmitting a first ping to a data center associated with managing virtual private networks (VPNs) in the cellular network in response to determining that the received signal corresponds to the polling signal;

generating a second ping and a keep-alive message, substantially simultaneously with the generating and transmitting of the first ping, for transmission via an encrypted path in the cellular communication network in response to determining that the received signal corresponds to the polling signal, wherein the first ping and second ping are used to ensure that cellular connections through the cellular communication network are operating properly transmitting the keep alive message in response to determining that data is ready to be transmitted over the encrypted path;

receiving a reply to the keep alive message over the encrypted data path; and transmitting the data via the encrypted path in response to receiving the reply to the keep alive message.

17. The method of claim 16, further comprising:

transmitting the second ping in response to the reply to the keep alive message being received over the encrypted path from a data center associated with managing virtual private networks (VPNs) in the cellular communication network.

18. The method of claim 17, wherein the first ping, second ping and keep alive message are synchronized with the polling signal.

19. The method of claim 17, further comprising:

determining whether responses to each of the first and second pings are received within a predetermined time; and initiating a failure recovery process to transmit data over an alternative path in the cellular communication network, when responses to the first and second pings are not received within the predetermined time.

\* \* \* \* \*